US005893994A

United States Patent [19]

Irwin et al.

[11] Patent Number: 5,893,994

[45] Date of Patent: Apr. 13, 1999

[54] ADJUSTABLE LENGTH HEAT TUNNEL FOR VARYING SHOT LENGTHS

[75] Inventors: Jere F. Irwin; Gerald M. Corbin; Jeffrey S. LaMont, all of Yakima, Wash.

[73] Assignee: Irwin Research & Development, Inc., Yakima, Wash.

[21] Appl. No.: 08/635,091

[22] Filed: Apr. 17, 1996

[51] Int. Cl.[6] .............................. B29C 33/02; F27B 9/28

[52] U.S. Cl. .............................. 219/388; 425/384

[58] Field of Search .............................. 219/388; 34/216, 34/217; 99/386, 443 R, 443 C, 477; 425/384; 373/71; 432/121, 128, 152, 225; 118/641–643, 65–67; 264/319–321, 328.14

[56] References Cited

U.S. PATENT DOCUMENTS

| | | | |
|---|---|---|---|
| 3,721,178 | 3/1973 | Szabrak et al. | 99/386 |
| 3,830,611 | 8/1974 | Irwin | 264/321 |
| 3,876,361 | 4/1975 | Irwin | 425/451.6 |
| 4,105,386 | 8/1978 | Thiel et al. | 425/217 |
| 4,608,009 | 8/1986 | Whiteside et al. | 425/590 |

FOREIGN PATENT DOCUMENTS

| | | |
|---|---|---|
| 2369228 | 6/1978 | France . |
| 4-80591 | 3/1992 | Japan . |
| 5-295452 | 11/1993 | Japan . |

*Primary Examiner*—John A. Jeffery
*Assistant Examiner*—J. Pelham
*Attorney, Agent, or Firm*—Wells, St. John, Roberts, Gregory & Matkin, P. S.

[57] ABSTRACT

An improved heat tunnel is provided for use with a thermo-forming press. The heat tunnel includes a first oven body having a heat source therein for applying heat to a web of thermo-formable material as the web is supported therein. The tunnel includes a second oven body having a heat source therein for applying heat to a web of thermo-formable material as the web is supported therein. Furthermore, the tunnel has an adjustable length tunnel body carried between the first and second oven bodies and configurable to adjust the overall length of the heat tunnel so as to realize a desired delivery of heat to a web of material being passed there through.

20 Claims, 5 Drawing Sheets

44
66
62
34
42
71
70
36
69
68
6
64
62
32
72
38
74
40

ADJUSTABLE LENGTH HEAT TUNNEL FOR VARYING SHOT LENGTHS

TECHNICAL FIELD

This invention relates to apparatus for heating a web of plastic material prior to processing in a thermal forming machine when producing thin walled plastic articles.

BACKGROUND OF THE INVENTION

During the manufacture and forming of products from sheets or webs of plastic material, ovens are used to preheat the web of material prior to molding the plastic material into groups of plastic thin-walled articles. Typically, the oven forms part of a thermo-forming machine having a thermo-forming press. A number of different articles can be formed from a sheet or web of plastic material as it is fed from a storage roll. Accordingly, a thermo-forming press produces a large quantity of molded articles by intermittently passing a progressing succession of adjacent sections, or shot lengths of web into the press, after which the web is stamped or formed. The mold is also used to hold or clamp the web in a stationary location while it is being stamped. Hence, the web is fed into the thermo-forming press in an intermittent fashion, and in footprints defined by the size and shape of the mold (top and bottom die) of the press as it operates in cycles on the web.

A typical prior oven construction consists of an elongate oven having open leading and trailing ends. Heating elements inside the oven, for example resistance heaters, operate to heat successive portions of a sheet as it is intermittently delivered into the thermal forming press at a desired molding temperature. However, the ability to properly heat a continuous thermo-formable plastic sheet or web of material to a desired temperature depends upon the amount of energy transferred to the sheet, which is, in part, dependent upon the amount of time that the web passes through the oven. Typical oven constructions utilize an oven body having a finite length. Therefore, in order to tailor heat delivery to a thermo-formable plastic sheet prior to feeding the sheet into a thermo-forming press requires an adjustment of the stationary time that the wet, sits within the press and oven.

One problem encountered when attempting to adjust the heat delivery to a thermal forming sheet passing through a finite length oven is the necessity of tailoring the oven length to the particular application, or adjusting the stop time during which the thermo-forming press has locked the web in a stationary position. In normal operations, it is desirable to increase production rate. Therefore, it is desirable to operate a thermo-forming press in as short a cycle time as is physically possible by the constraints of the press operation and web deformation between pairs of interlocking dies. Therefore, it is desirable to tailor heat delivery to the web through some other means. One possibility is to controllably adjust the heat output from each of the thermal resistance elements carried within art oven. However, such an attempt at heat delivery requires careful monitoring of heat being delivered and time during activation for each of the elements. Hence, a complex control scheme is needed to track and target heat and delivery values for each of the elements in an oven.

Therefore, a need has arisen to provide for a simple and economical oven construction that enables the adjustable tailoring of heat delivery to a web of thermo-formable plastic sheet material to be passed through a thermo-forming press that operates on a staged or intermittent stamping principle.

The objective of the present invention is to provide an improved heat tunnel construction for varying shot lengths and heat delivery to a web of material that can always be tailored to relate to the different regions of the product being formed from the web.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In accordance with one aspect of this invention, an improved heat tunnel is provided for use with a thermo-forming press. The heat tunnel includes a first oven body having a heat source therein for applying heat to a web of thermo-formable material as the web is supported therein. The tunnel includes a second oven body having a heat source therein for applying heat to a web of thermo-formable material as the web is supported therein. Furthermore, the tunnel has an adjustable length tunnel body carried between the first and second oven bodies and configurable to adjust the overall length of the heat tunnel so as to realize a desired delivery of heat to a web of material being passed therethrough.

In accordance with another aspect of this invention, an improved heat tunnel includes a first oven body constructed and arranged to apply heat to a web of thermo-formable material. The heat tunnel also includes a second oven body constructed and arranged to apply heat to a web of thermo-formable material. Furthermore, the heat tunnel includes an adjustable length tunnel body carried between the first and second oven bodies and configurable to adjust the overall length of the heat tunnel so as to realize a desired delivery of heat to a web of material being passed through the heat tunnel.

Figure 1:
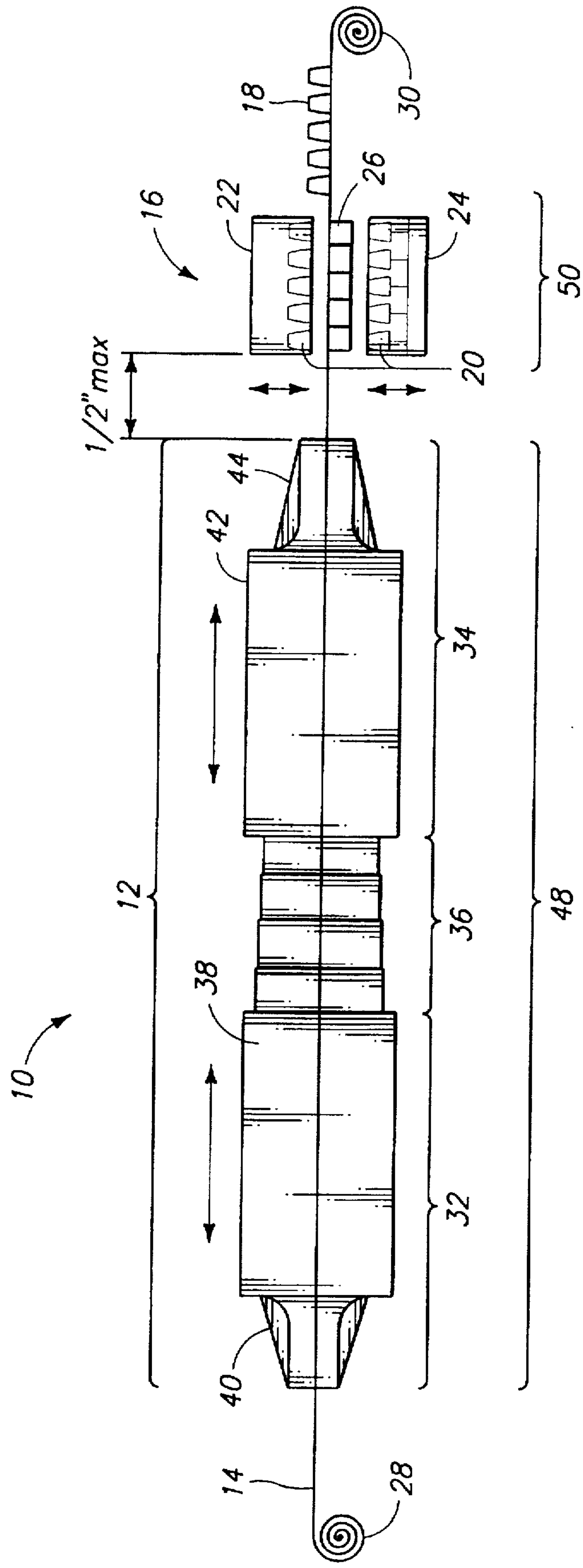
FIG. 1 is a schematic side view representation of an adjustable length heat tunnel and thermo-forming press which together form a thermo-forming machine in accordance with the preferred embodiment of the invention.

A preferred embodiment of a thermo-forming machine is generally designated with the reference numeral 10. Machine 10 includes an adjustable length heat tunnel, or oven 12 as illustrated in FIG. 1. A web 14 of thermo-formable plastic material is passed through the tunnel 12 and into a thermo-forming press 16. Tunnel 12 is constructed to have an adjustable length, enabling production and delivery of a desired amount of heat energy to a web 14 of thermo-formable plastic material as it is being delivered through the tunnel 12 and into a thermo-forming press 16. A plurality of thin-walled articles 18 are produced from the web by pairs of mating male and female die assemblies 20. Each die assembly is formed from a pair of mating male and female die that are carried by an upper platen 22 and a lower platen 24, respectively. Upper platen 22 is lowered into contact with a clamping grid 26 to lock in position the web, after which the lower platen 24 is raised during the molding of articles 18. Typically, lower platen 24 includes a support member having a plurality of male die members that are raised from the lower platen, causing the web to be drawn into cavities within the upper platen 22.

According to FIG. 1, web 14 is delivered in an intermittent and metered manner from a storage roll 28 through tunnel 12 and press 14 by activating one or more servo drives. Typically, the web 14 is supported by a plurality of rollers. At least one pair of the rollers, mated together on opposite sides of web 14, are driven by a servo drive, causing the web 14 to be fed upon activation of the servo drive. Activation of the pair of rollers delivers the web through tunnel 12 and press 16 onto a waste storage roll 30. In one system, articles 18 are simultaneously severed from web 14 after formation in press 16. In another version, articles 18 must be removed from web 14 after they are thermo-formed by implementing a secondary cutting operation. In the latter case, the remaining scrap web is wound onto storage web 30 for subsequent reprocessing.

According to FIG. 1, heat tunnel 12 is formed from a leading oven member 32, a trailing oven member 34 and a telescoping and medially positioned tunnel assembly 36. Telescoping tunnel assembly 36 is supported and sealed at either end to members 32 and 34, respectively. One or more heat sources are provided within members 32 and 34. Tunnel assembly 36 does not have a heat source, enabling a compact and telescopic construction. However, heat supplied from members 32 and 34 provides a sufficient supply of heat within assembly 36 so that heat delivery to web 14 is reasonably uniform. Alternatively, it is possible to provide heating elements within assembly 36, pursuant to the heat sources disclosed below for use with members 32 and 34.

Leading oven member 32 of FIG. 1 is formed from an oven body 38 and an entry hood 40. Similarly, trailing oven member 34 is formed from an oven body 42 and an exit hood 44. Oven bodies 38 and 42 are formed from a plurality of structural frame members that are enclosed with a layer of exterior sheet metal. Similarly, hoods 40 and 42 are each formed from a folded sheet metal construction. Additionally, entry hood 40 and exit hood 42 each have a reduced-size mouth portion 46 which reduces heat loss from heat tunnel 12 at each end.

According to the construction of FIG. 1, leading oven member 32 and trailing oven member 34 are carried by a support frame (not shown) in relative movable relation along the axis of web 14. In this manner, the relative positions of members 32 and 34 can be adjusted, causing tunnel assembly 36 to telescope therebetween. Hence, assembly 36 can be lengthened or shortened. In this manner, the total length of the region 48 where heat is applied to web 14 can be adjusted to realize a desired heating of a shot length 50 of web that is to be formed in press 16. Preferably, shot length 50 is defined by the length of the foot print of press 16, and web 14 is advanced the same length as the shot length between successive forming cycles.

Figure 2:
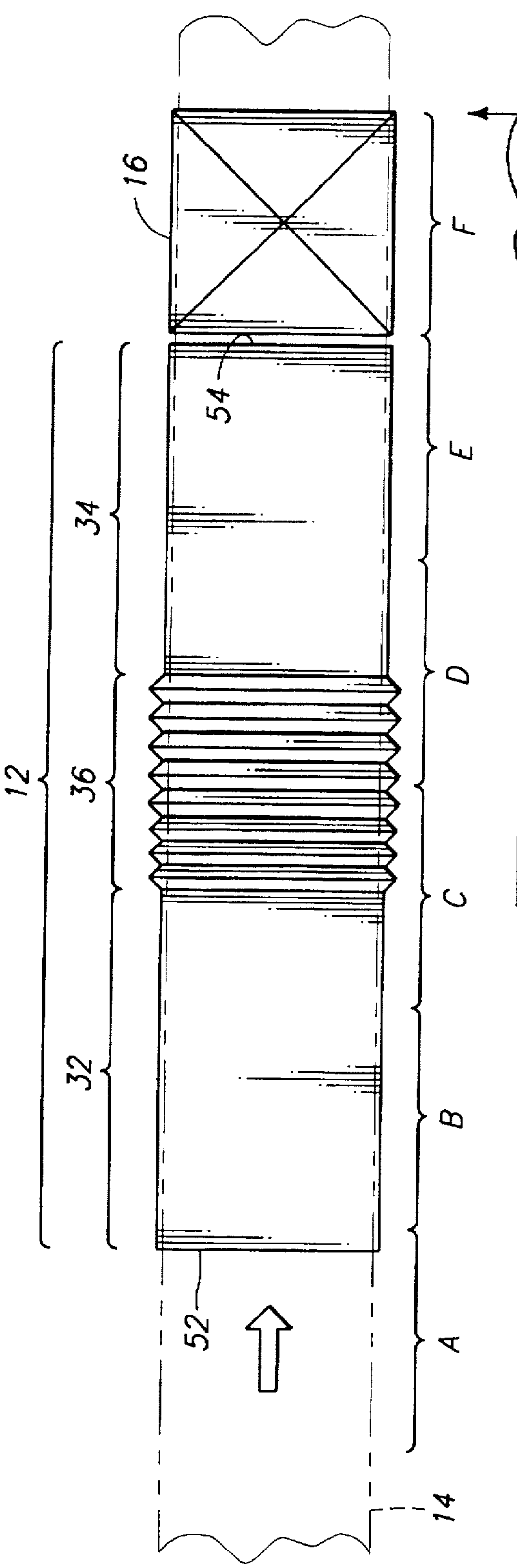
FIG. 2 is a plan view of the thermo-forming machine, including the adjustable length heat tunnel according to the machine of FIG. 1.

FIG. 2 illustrates a plan-view schematic representation of heat tunnel 12 adjusted to an exemplary desired length for a web 14 of thermo-plastic material being passed therethrough. Web 14 is moved in stages to advance the web 14 to the next position only when press 16 is open. Hence, web 14 remains stationary in five successive shot-length positions prior to being advanced into a sixth-stage press operation. Stages 1 through 5 are illustrated by reference letters A–E, respectively. The length of tunnel 12 has been adjusted to produce a reasonably uniform application of heat to web 14, imparting uniform molding characteristics across an advanced shot-length of the web while it is being molded. Hence, a higher quality of molded articles are more consistently produced during a molding operation. All of this is accomplished without adjusting or varying the application of heat within the tunnel. Further tailoring of heat delivery can be carried out by adjusting the heat delivery within the tunnel, as will be discussed below.

Figure 3:
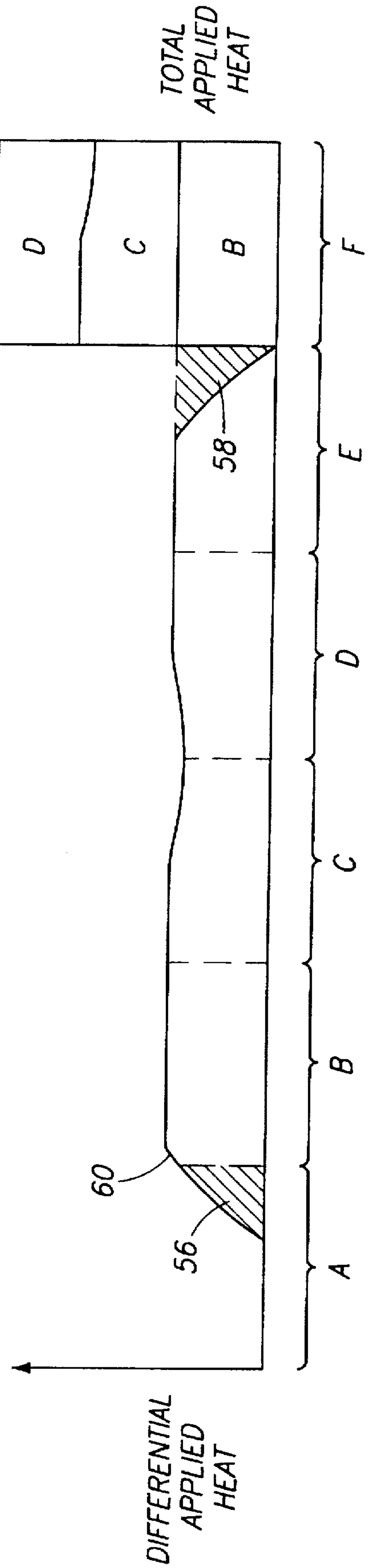
FIG. 3 is a temperature profile of a web of thermo-formable plastic sheet material plastic material as it progresses through each of four foot-print successive stages leading to stamping within the press as illustrated in FIG. 2.

FIG. 3 illustrates a temperature profile for differential heat as it is applied to web 14 by heat tunnel 12 at each of stages A through E. For this case, it is assumed that heat has been applied uniformly from the heating elements within the tunnel. FIG. 3 also illustrates the total amount of applied heat that has been delivered to web 14 during stages A through E. The cumulative heat delivered at stages A–E produces a shot length of web at stage F having a fairly uniform temperature profile. Hence, the shot length of web at stage F is formed in press 16 while it has desired uniform temperature characteristics.

According to FIG. 2, leading edge 52 of tunnel 12 has been adjustably positioned to a desired length by extending or telescoping tunnel assembly 36. A multiple number of successive shot-lengths are held in stationary locations A–E within the tunnel 12 during each operating cycle for press 16. Leading edge 52 has been positioned with approximately four inches of overlap past the leading edge of station B, and into station A.

For example, as shown in FIG. 2, shot-length station "A" is the first position of web 12 where heat is applied for a series of stamping cycles leading to stamping by press 16 at station "E". Only the right edge of web 14 is heated while at station A, due to overlap of edge 52 and heat loss from the end of tunnel 12. Shot-length station "B" represents the position of web 12 during the next press operation. Shot-length station "C" represents the third illustrated shot-length cycle, or the third complete stationary press cycle in which web 14 is heated by tunnel 12. Shot-length station "D" represents the fourth press cycle position of web 14 prior to being stamped by press 16. Similarly, shot-length "E" is the fifth and final press cycle position of web 14 being heated prior to being formed.

It is readily apparent from viewing FIG. 2 that tunnel 12 is placed as close as possible to press 16 to minimize heat loss prior to forming. Typically, the space between the trailing end of tunnel 12 and the leading end of press 16 is no more than. Alternatively, the distance can be greater or less. Web 14 extends outside of the trailing edge 54 on tunnel 12 a slight amount, just before being advanced to shot-length station "F" where it is stamped. Therefore, heat application during shot-length "E" is not uniform as heat escapes from the trailing edge of tunnel 12. Similarly, as web 14 is positioned at station "A", heat escapes from leading edge 52, causing localized heating of web 14 prior to entry into tunnel 12.

The above staged heating of web 14 is illustrated according to the temperature profile depicted in FIG. 3. Following the shot-length stages A–E, a non-uniform amount of heat is applied to web 14 while in the stage "A" position, prior to entering tunnel 12. Prior to entering stage "A", the edge of web 14 adjacent to tunnel 12 is locally heated according to the shaded region 56. The differential heat which is applied to web 14 while it is positioned in station "B" appears to be nearly uniform, in light of the even nature of heating provided by the construction of tunnel 12 (and particularly oven body 32) therein. Similarly, web 14 is uniformly heated while located at stations "C" and "D". However, a slight drop occurs within tunnel assembly 36 since there are no heating elements within that portion of the tunnel. The final station "E", which precedes movement into station "F" where a stamping operation is performed, shows an uneven heating distribution, as heat escapes from the trailing edge 54 of oven 12 (as depicted in FIG. 2). The heat lost from the tunnel trailing edge is denoted generally by the area of region 58.

Finally, region "F" has been plotted to illustrate the total, or cumulative heat applied to web 14 from regions A–E, and shaded region 56. Web 14 progresses through and out of tunnel 12, acquiring heat along the way, preceding the final cycle operation where web 14 is stamped by press 16 at station "F". Hence, the heat which has built up in web 14 within a defined "shot-length" (i.e. the length of press 16) as it moves through tunnel 12 is illustrated by the total applied heat as plotted at station "F".

For purposes of visualizing the uniform application of heat to a "shot-length" of web 14 during a stamping operation at station "F", the addition of areas within the region bounded by curve 60 produces an area of reasonably uniform applied heat for presentation at station "F". Additionally, or alternatively, arrays of switchable heating elements can be provided within members 32 and 34, at either end of tunnel 12, enabling even further tailoring of heat application of a web 14 being passed through tunnel 12. Additionally, other suitable lengths for tunnel 12 can be realized by merely adjusting the overall length. For example, if the "shot-length" of web 14 is changed due to a change of die size being used in press 16, an operator merely needs to adjust the length of tunnel 12 to a desired length to achieve a suitable temperature profile of the web passing through the oven. Furthermore, if less heat is needed for a given operation, the oven can be shortened to reduce the number of stations that the web will sit within the oven prior to being stamped.

Figure 4:
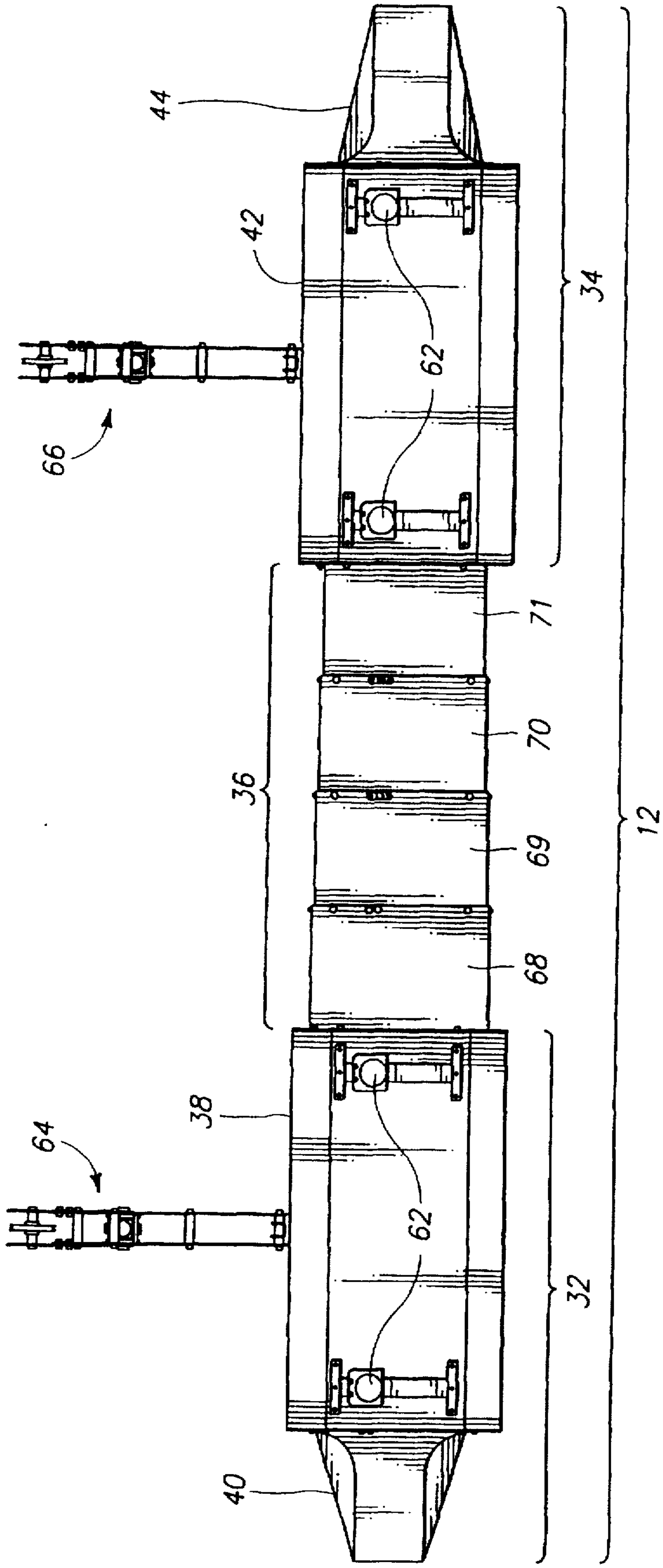
FIG. 4 is a side view of a preferred construction of the adjustable length heat tunnel depicted schematically in FIGS. 1–3.

FIG. 4 illustrates an elevational view of one construction for heat tunnel or oven 12. According to this construction, oven bodies 38 and 42 are each constructed by securing sheet metal via a plurality of rivets or fasteners to a metal framework. A pair of guide rollers 62 are mounted on each side of body 38 and 40, respectively. For example, a roller bearing guide roller can be used to form roller 62. Preferably, roller 62 on bodies 38 and 42 are positioned along a common horizontal axis. Alignment of rollers 62 enables the mounting of heat tunnel 12 along a pair of inwardly facing and opposed c-channel guide tracks along which each of roller 62 are received. In this manner, the c-channel tracks form raceways there along in which the rollers 62 track. One suitable track construction is depicted and described below with reference to FIG. 6. Hence, oven members 32 and 34, as well as tunnel assembly 36 are supported by rollers 62 on a framework supported track.

Additionally, overhead frame assemblies 64 and 66 are configured atop of bodies 38 and 42, respectively, for enabling rapid opening of portions of bodies 38 and 42 to expel heat. During certain operations, it may be necessary to quickly remove heat from the oven. Each assembly 64 and 66 is formed from a pair of vertically extending support members, mounted inwardly of the sides of tunnel 12, and extending upwardly therefrom.

According to FIG. 4, telescoping tunnel assembly 36 is formed from a plurality of telescoping hood members 68–71. In this case, member 71 telescopes within an adjacent end of member 70, member 70 telescopes within an adjacent end of member 69, and member 69 telescopes within an adjacent end of member 68. Preferably, roller bearings facilitate sliding contact there between. Alternatively, low-friction sliding contact points can be used. Preferably, a terminal lip flange prevents adjacent members from pulling completely apart. Member 68 is rigidly affixed and supported to body 38 along a common adjoining edge. Preferably, member 68 is secured to body 38 with a plurality of fasteners. Similarly, member 71 is rigidly affixed and supported to body 42 along a common adjoining edge.

Figure 5:
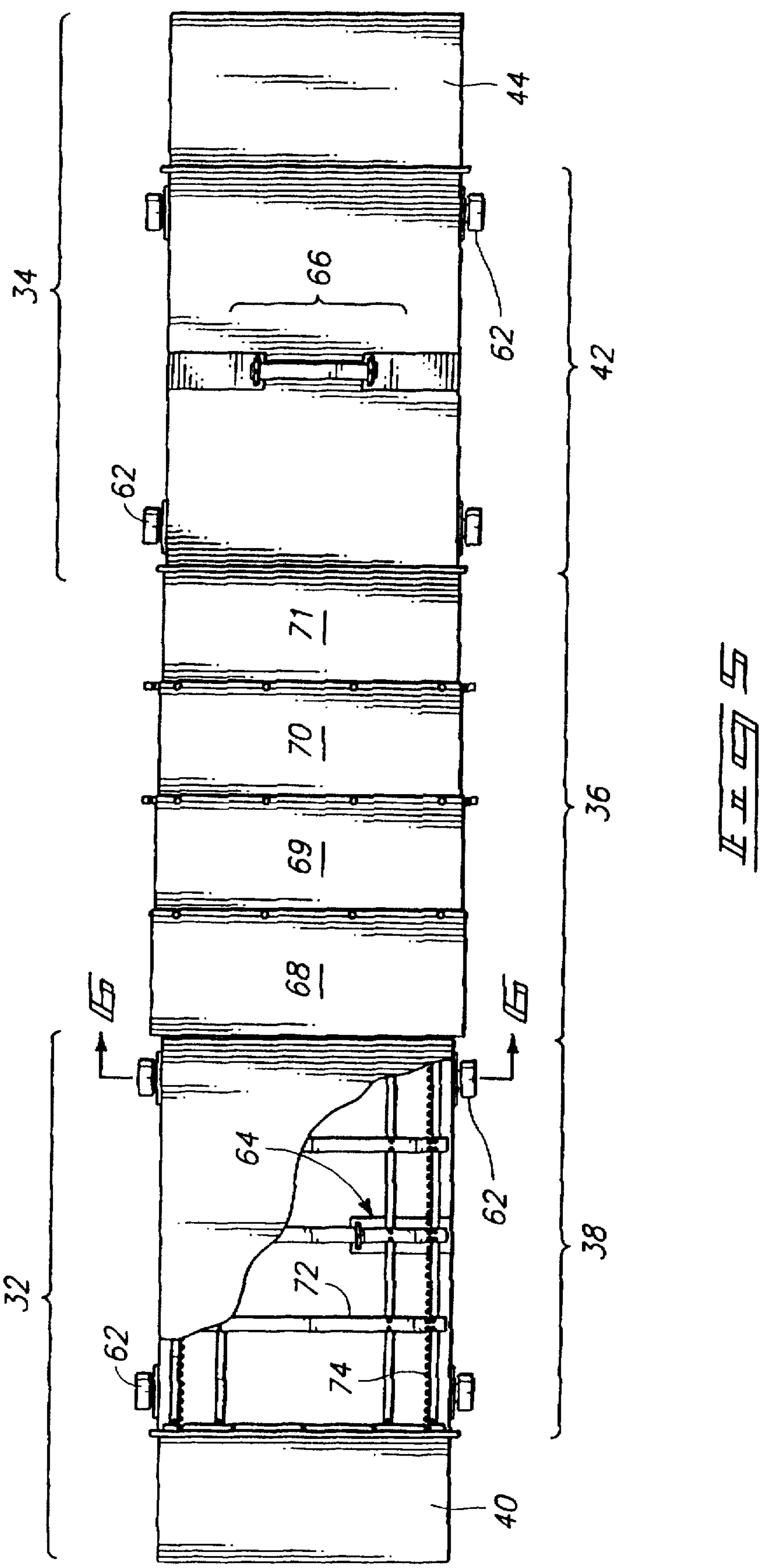
FIG. 5 is a plan view of the adjustable length heat tunnel of FIG. 4.

According to the construction depicted in FIGS. 4 and 5, hoods 40 and 44 have top and bottom surfaces that taper, forming a slot-shaped mouth opening through which the web is passed. Additionally, the top and bottom faces have a curved, or tunnel shaped construction suitable for maintaining a desired volume within the hood.

According to FIG. 5, the layout of rollers 62 on either side of members 32 and 34 is visibly apparent. Two pair of rollers are used to support each member. Furthermore, the two pair of rollers are positioned on each member spaced apart as far as practical along each member, to impart stability to the m ember as it is rolled along a guide rail.

A portion of oven body 38 on member 32 is shown with the sheet metal skin removed in FIG. 5. An array of structural framework members 72 which support the sheet metal skin, rollers 62, hood 40, telescoping member 68, and frame assembly 64 are visible. Members 72 are preferably secured together with threaded fasteners, rivets, or welds. The surrounding sheet metal skin is then secured to the outside of the framework with fasteners.

Figure 6:
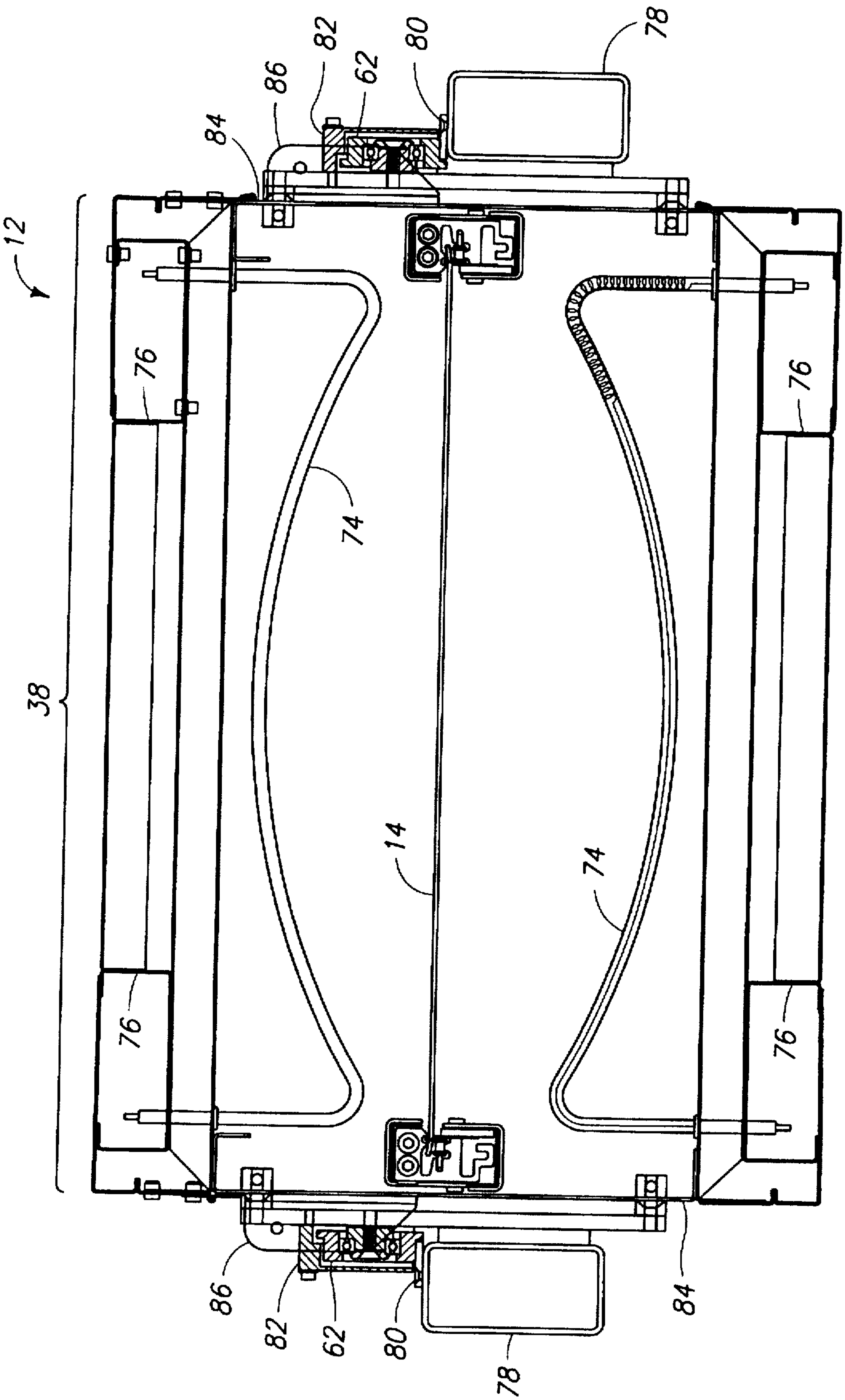
FIG. 6 is a vertical sectional view taken along line 6—6 of FIG. 5 illustrating the construction and heating element arrangement within the adjustable length heat tunnel of FIGS. 4–5.

Also visible in the partial breakaway view of FIG. 5 is an array of resistive heating elements 74 which are supported in nested adjacent relation within oven body 38. Each element 74 is supported at opposite ends from a pair of top frame members or bottom frame members (as depicted in FIG. 6, below). In operation, electricity is supplied to one or more of the elements, causing them to produce heat along their entire length.

A further feature of this invention is provided by the use of an array of elements 74, configured transversely across the path of a web. It is possible to only turn on elements 74 that lie directly over portions of a shot-length that are to be formed in a press. For example, a press may only be used to form a web along a middle one-third section, requiring heat only in this area. Therefore, elements 74 that lie over that portion of a web within a station, and as part of a shot-length, only need be turned on. In this manner, heat delivery can be tailored so that it relates to the different regions of the web where the product is to be formed, even as the web is passed in stages through a tunnel.

FIG. 6 illustrates a vertical cross-sectional view of oven body 38, taken along line 6—6 of FIG. 5. A pair of top and bottom heating elements 74 can be seen clearly in this view. Each element is constructed and arranged to form a curved surface along a portion that lies across a web being passed within the oven body. The bottom element 74 is shown in sectional view, depicting the heating wire carried within its metal outer body. Element 74 has nearly all of its heat delivery at the right corner, since the internal heating wire is coiled along the right corner. The coil produces the bulk of the heat output from the element. The top element 74 is identically constructed. However, the next row of elements are heated on the left corner. This pattern alternates with each successive row of top and bottom elements.

In this manner, a suitably even distribution of heat is applied across a web contained therein, both along the top and bottom sides. By delivering heat to the corners, in alternating left and right arrays, a more uniform temperature distribution is realized within tunnel 12. This is due largely to the fact that tunnels or ovens tend to collect heat at their centers. Furthermore, the sheet metal sides 84 of the oven body tend to dissipate heat. Therefore, more heat is required along the edges and any attempt to supply heat along the outer edges serves to mitigate this problem. Additionally, elements 74 are configured further away from web 14 along the central region.

To support an array of heating elements 74 within oven body 38, a pair of longitudinally extending frame members 76 are formed in the top and bottom regions of body 38. One end of each element 74 is mounted to a sheet metal pan which is formed between each pair of frame members, providing a structural support member therebetween. Electrical wiring (not shown) is then fed through members 76 from a single common source, or feedline.

Web 14 is shown in FIG. 6 being carried between the top and bottom elements 74 by a pair of water-cooled chain driven rail guides. A chain having a plurality of teeth perforates and engages web 14 on either edge, engaging the web to move it through the tunnel. Water cooling prevents overheating of the web where it contacts the chain and rail guides.

FIG. 6 also illustrates the support rail structure that supports and guides members 32 and 34 (of FIGS. 1–5). A pair of rollers 62 are shown in seated engagement with a complimentary pair of guide rails 82. Each rail 82 is removably mounted on top of a longitudinally extending tubular steel support rail 78 by a support plate 80. Roller 62 is entrapped between plate 80 and guide rail 82, upon being assembled together. Plate 80 and rail 82 form a c-channel shaped member, when affixed together. Furthermore, plate 80 is then secured to rail 78 with a plurality of threaded fasteners. Rails 78 are supported by frame members that mount to the press at one end, and mount to a vertical support frame (not shown) at an opposite end. In this manner, plate 80 forms a longitudinal raceway on top of which each of rollers 62 seat in rolling engagement.

To support the loads of tunnel 12, rollers 62 are attached to oven bodies 38 and 42 by individual roller carrier support assemblies 86. Assemblies 86 are formed from metal brackets which affix to the sides of each oven body, for example, to body 38 of FIG. 6. Various alternative mounting techniques can be used to support oven bodies 38 and 42 in relative axially movable relation, enabling telescoping of tunnel assembly 36 therebetween (as depicted in FIG. 5).

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A heat tunnel for use with a thermo-forming press, comprising:

an entrance oven body having an entrance opening configured to receive a web of thermo-formable material, and a heat source therein configured to apply heat to the web as the web is transported therethrough;

an exit oven body having an exit opening substantially level with the entrance opening and configured to receive the web, and a heat source therein configured to apply heat to the web as the web is transported therethrough; and an adjustable length tunnel body carried between the entrance and exit oven bodies and configured to join together the entrance oven body and the exit oven body in adjustably spaced apart relation and operative to adjust the overall length of the heat tunnel so as to realize a desired delivery of heat to a web of material being conveyed in an intermittent and metered manner therethrough.

2. The heat tunnel of claim 1 wherein the heat source comprises a resistive heating element.

3. The heat tunnel of claim 2 wherein the heating element comprises a crescent-shaped wire form construction.

4. The heat tunnel of claim 1 wherein the heat source comprises an upper and a lower array of resistive heating elements carried within the oven body, the web being passed there between to impart heating there along.

5. The heat tunnel of claim 1 wherein the tunnel body comprises a plurality of telescoping tunnel members, one of an adjacent pair of members slidably received within another of the adjacent pair of members.

6. The heat tunnel of claim 1 further comprising a hood mated with an end of the oven body opposite the tunnel body.

7. The heat tunnel of claim 1 wherein one of the oven bodies further comprises a plurality of rollers carried thereon, and the heat tunnel further comprises at least one support rail having a raceway for receiving the rollers movably there along, the one oven body movable with respect to the other oven body, imparting extension/retraction to the adjustable length tunnel body carried therebetween.

8. The heat tunnel of claim 7 wherein the other of the oven bodies further comprises a plurality of rollers carried thereon, the at least one support rail having a raceway for receiving the rollers movably there along, the one oven body movable with respect to the other oven body, imparting extension/retraction to the adjustable length tunnel body carried therebetween.

9. The heat tunnel of claim 1 wherein a pair of support rails are provided, one on either side of the oven body, constructed and arranged to receive rollers therein for movably carrying the oven body there along.

10. The heat tunnel of claim 1 wherein the heat source of the entrance and the exit oven bodies each comprise a plurality of laterally disposed and elongate heating elements constructed and arranged to be independently operable so as to enable tailored delivery of heat to the web of material that relates to the product being formed.

11. A heat tunnel, comprising:

a first oven body constructed and arranged to apply heat to a web of thermo-formable material;

a second oven body supported in similar elevational relationship with the first oven body, the second oven body constructed and arranged to apply heat to a web of thermo-formable material; and an adjustable length tunnel body carried between the first and second oven bodies and configurable to adjust the overall length of the heat tunnel so as to realize a desired delivery of heat to a web of material being conveyed through the heat tunnel.

12. The heat tunnel of claim 11 wherein at least one of the oven bodies comprises a resistive heating element constructed and arranged to heat the web of material being supported therein.

13. The heat tunnel of claim 12 wherein the at least one oven body comprises an upper and a lower array of resistive heating elements carried within the oven body, the web being passed there between to impart heating there along.

14. The heat tunnel of claim 11 further comprising a hood mated with an end of the oven body opposite the tunnel body.

15. The heat tunnel of claim 11 wherein the tunnel body comprises a plurality of telescoping tunnel members, one of an adjacent pair of members slidably received within another of the adjacent pair of members.

16. The heat tunnel of claim 11 wherein one of the oven bodies further comprises a plurality of rollers carried thereon, and the heat tunnel further comprises at least one support rail having a raceway for receiving the rollers movably there along, the oven body movable with respect to the other oven body, imparting extension/retraction to the adjustable length tunnel body carried therebetween.

17. A thermo-formable web heat tunnel, comprising:

a first oven body having a heat source comprising an upper and a lower array of resistive heating elements configured to apply heat to a web of thermo-formable material as the web is conveyed therebetween to impart heating there along;

a second oven body having a heat source comprising an upper and a lower array of resistive heating elements configured to apply heat to a web, of thermo-formable material as the web is conveyed therebetween to impart heating there along; and an adjustable length tunnel body carried between the first and second oven bodies in associated relation and configurable to adjust the overall length of the heat tunnel so as to realize a desired delivery of heat to a web of material being intermittently conveyed therethrough.

18. The heat tunnel of claim 17 wherein the tunnel body comprises a plurality of telescoping tunnel members, one of an adjacent pair of members slidably received within another of the adjacent pair of members.

19. The heat tunnel of claim 17 wherein each heat source comprises an array of heating elements configured transversely across a travel path of a web received there along.

20. The heat tunnel of claim 19 wherein the array of heating elements is configured to be selectively enabled via application of electricity so as to produce heat directly over a desired shot-length of a web which is to be formed in a thermo-forming press positioned immediately downstream thereof.

* * * * *

UNITED STATES PATENT AND TRADEMARK OFFICE

CERTIFICATE OF CORRECTION

PATENT NO. : 5,893,994 Page 1 of 3

DATED : April 13, 1999

INVENTOR(S) : Jere F. Irwin, et al

It is certified that error appears in the above-identified patent and that said Letters Patent is hereby corrected as shown below:

In the Abstract:

Last two lines, delete "passed there through", and insert --passed therethrough--.

Col. 1, line 41, delete "that the wet, sits", and insert --that the web sits--.

Col. 1, line 56, delete "within art oven", and insert --within an oven--.

Col. 2, lines 19-20, delete "thermo-formable plastic sheet material plastic material as it", and insert --thermo-formable plastic sheet material as it--.

Col. 4, line 13, delete "quality of molded articles are" and insert --quality of molded articles is--.

Col. 4, line 57, after "more than", insert --one-half inch--.

Col. 5, line 54, delete "42 are positioned", and insert --42 is positioned--.

UNITED STATES PATENT AND TRADEMARK OFFICE

CERTIFICATE OF CORRECTION

PATENT NO. : 5,893,994

DATED : April 13, 1999

INVENTOR(S) : Jere F. Irwin, et al

It is certified that error appears in the above-identified patent and that said Letters Patent is hereby corrected as shown below:

Col. 5, line 58, delete "each of roller 62 are received", and insert --each of roller 62 is received--.

Col. 6, line 11, delete "contact there between", and insert --contact therebetween--.

Col. 6, line 37, delete "assembly 64 are visible", and insert --assembly 64 is visible--.

Col. 6, line 42, delete "which are supported", and insert --which is supported--.

Col. 7, lines 5-6, delete "row of elements are", and insert --row of elements is--.

Col. 7, line 38, delete "complimentary pair", and insert --complementary pair--.

UNITED STATES PATENT AND TRADEMARK OFFICE
CERTIFICATE OF CORRECTION

PATENT NO. : 5,893,994

DATED : April 13, 1999

INVENTOR(S) : Jere F. Irwin, et al

It is certified that error appears in the above-identified patent and that said Letters Patent is hereby corrected as shown below:

In the Claims

Col. 8, lines 27-28, claim 4, delete "passed there between", and insert --passed therebetween--.

Col. 9, line 13, claim 13, delete "passed there between", and insert --passed therebetween--.

Signed and Sealed this

Fourteenth Day of September, 1999

Attest:

Q. TODD DICKINSON

*Attesting Officer* *Acting Commissioner of Patents and Trademarks*